United States Patent [19]

Buzzelli

[11] Patent Number: 4,942,655

[45] Date of Patent: Jul. 24, 1990

[54] E CLIP FASTENER INSTALLING TOOL

[76] Inventor: Robert Buzzelli, 29184 Martindale, New Hudson, Mich. 48165

[21] Appl. No.: 391,191

[22] Filed: Aug. 8, 1989

[51] Int. Cl.[5] .............................................. B23P 19/04

[52] U.S. Cl. .................................... 29/229; 29/243.56; 29/278

[58] Field of Search ............ 29/270, 278, 229, 243.56; 254/28

[56] References Cited

U.S. PATENT DOCUMENTS

| | | | |
|---|---|---|---|
| 1,684,526 | 9/1928 | Tucker et al. | 29/270 |
| 2,613,562 | 10/1952 | Clark | 29/270 |
| 3,190,250 | 6/1965 | Hinden | 29/280 |
| 3,470,600 | 10/1969 | Hosback | 29/229 |
| 3,624,884 | 12/1971 | Scime | 29/280 |
| 3,747,195 | 7/1973 | Rigsby et al. | 29/229 |
| 4,277,872 | 7/1981 | Lewis | 29/229 |
| 4,475,276 | 10/1984 | Staten | 29/229 |
| 4,553,737 | 11/1985 | Yi | 254/28 |
| 4,675,994 | 6/1987 | Detloff | 29/270 |
| 4,873,754 | 10/1989 | Gleasman | 29/229 |

*Primary Examiner*—Robert C. Watson
*Attorney, Agent, or Firm*—Owen E. Perry

[57] ABSTRACT

An E clip fastener installing tool for holding and retaining an E clip fastener in a predetermined position prior to installing the fastener. The tool includes a body having first and second end portions and a shank portion extending between the first and second end portions. The first end portion terminates in a pair of blades disposed parallel and in spaced relationship with respect to each other to define a slot therebetween for holding and retaining the E clip fastener therein. The second end portion includes a polygonal shape presenting a plurality of surfaces and which is adapted to be supported by a tool bit holder.

6 Claims, 1 Drawing Sheet

FIG. 1
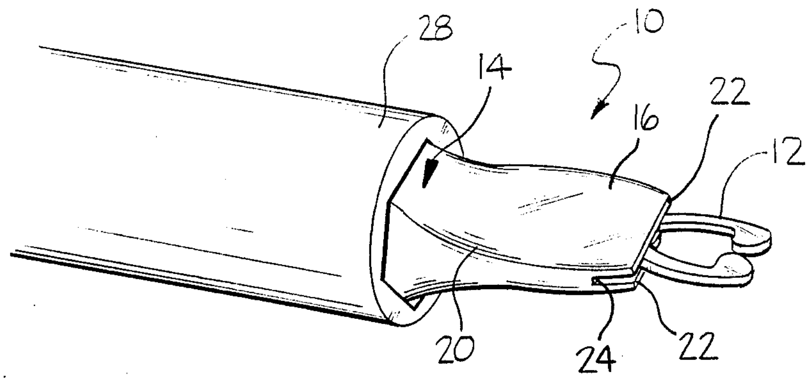
FIG. 2
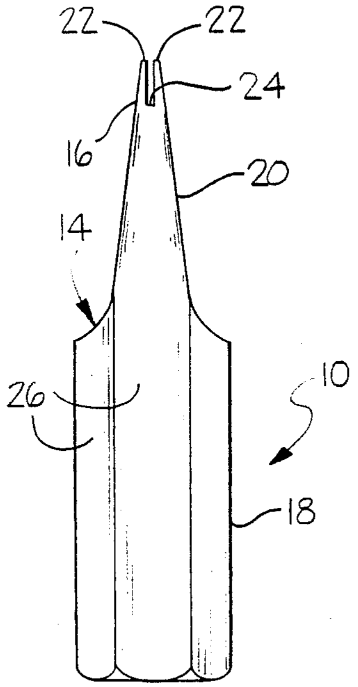
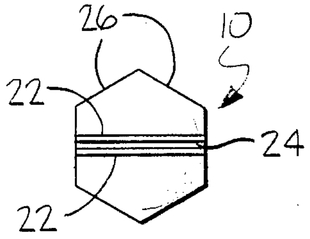
FIG. 3
FIG. 5
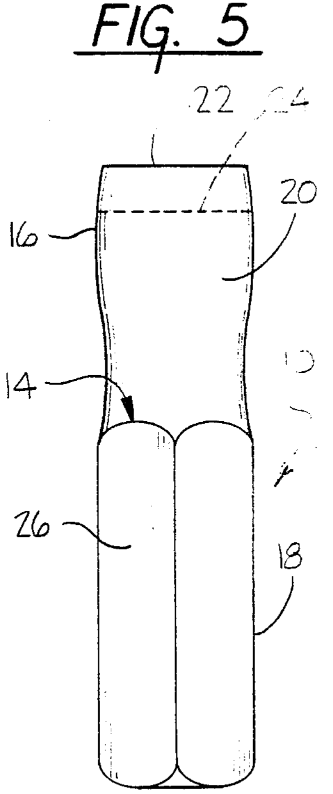
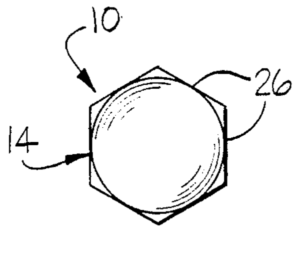
FIG. 4

E CLIP FASTENER INSTALLING TOOL

BACKGROUND OF THE INVENTION (1) Technical Field

The invention relates to an E clip fastener installing tool for holding and retaining E clip fasteners during the installation of the clip.

(2) Description of the Prior Art

E clip fasteners are employed, for example, in automotive applications and specifically in the carburetors of internal combustion engines. The name of these fasteners is derived from their generally "E" shape. The environment in which the E clip is often employed is rather cramped and thus, it is often difficult for an operator to install the clip using only his hands or a pair of pliers. This problem is compounded by the fact that the environment may also to dirty, greasy and/or wet. This can make the use of an otherwise very effective fastener difficult to employ.

E clip tool assemblies, however, are not unknown in the prior art. For example, U.S. Pat. No. 4,277,872, issued to Lewis on July 14, 1981 discloses a tool for installing and removing retaining clips including E clips. More specifically, the Lewis '872 patent discloses a tool including a handle having an shank and a pair of spaced apart metal blades disposed on the shank. The blades are magnetic such that an E clip may be magnetically retained between the blades until it is installed. However, the magnetized blades are generally subject to demagnetization due to the passage of time and once demagitized, the tool as disclosed in the '872 patent to Lewis is rendered useless unless it receives another magnetic charge.

The subject invention overcomes this deficiency and others in the prior art in a more efficient, user friendly E clip fastener installing tool.

SUMMARY OF THE INVENTION AND ADVANTAGES

The subject invention is directed toward a fastener installing tool for holding and retaining a fastener in a predetermined position prior to installing the fastener. More specifically, the fastener installing tool of the subject invention is particularly adapted for installing E clip type fasteners. The tool includes a body having first and second end portions and a shank portion extending between the first and second end portions. The first end portion terminates in a pair of blades disposed parallel and in spaced relationship with respect to each other to define a slot therebetween for holding or retaining the E clip fastener therein. The second end portion includes a polygonal shape presenting a plurality of surfaces and which is adapted to be supported in a tool bit holder.

The subject invention overcomes the problems in the prior art by including a faster installing tool which is specifically adapted for holding, retaining and installing an E type clip fastener between a pair of blades disposed parallel and in spaced relationship with respect to each other to define a slot therebetween. The polygonal shape of the second end portion is specifically adapted to be supported in a tool bit holder which, in turn, may be permanently magnetized. As such, a magnetic force may be applied through the tool to the E clip to better retain the E clip between the blades during installation. The fastener installing tool of the subject invention has the further advantage in that it is adapted to be used in conjunction with magnetic tool bit holders which are commonly employed in the manufacturing process.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the fastener installing tool shown supported by a tool bit holder and with an E clip disposed between the blades;

FIG. 2 is a side view of the fastener installing tool;

FIG. 3 is a top view of the fastener installing tool;

FIG. 4 is a bottom view of the fastener installing tool; and

FIG. 5 is another side view of the fastener installing tool.

DESCRIPTION OF THE PREFERRED EMBODIMENT

A fastener installing tool for holding and retaining a fastener in a predetermined position prior to installing the fastener is generally shown at 10. More specifically, the fastener installing tool 10 of the subject invention is particularly adapted for installing an E type clip fastener 12. The tool 10 includes a body, generally indicated at 14, having first and second end portions 16, 18 respectively, and a shank portion 20 extending between the first 16 and second 18 end portions.

The first end portion 16 terminates in a pair of blades 22 disposed parallel and in spaced relationship with resect to each other to define a slot 24 therebetween. The blades 22 which define the slot 24 are adapted for holding and retaining the fastener 12 therein.

The second end portion 18 includes a polygonal shape presenting a plurality of surfaces 26 which are adapted to be supported in a tool bit holder 28.

The body 14 of the tool 10 is susceptible to a magnetic force such that the fastener 12 may be magnetically retained between the blades 22 and within the slot 24 in the first end portion 16. Further, the blades 22 are spaced such that the E clip 12 forms an interference fit within the slot 24 and between the blades 22.

The plurality of surfaces 26 of the polygonal second end portion 18 define planes forming obtuse angles with respect to each other. In this form, the second end portion is particularly adapted to be received and supported in the tool bit holder 28. More specifically, the plurality of surfaces form a hexagonal shape. In this way, the E clip fastener installing tool 10 may be held and retained in a standard tool bit holder. In addition, the tool 10 is made of magnetically susceptible material. More specifically, the tool is typically made of cast iron. In this way, when the tool 10 is used in conjunction with a magnetic tool bit holder, the E clip 12 is magnetically retained between the blades 22 and within the slot 24. Said another way, in addition to the frictional force applied to the E clip by the slight interference fit between the blades 22, a magnetic retentive force is applied to the E clip through to tool 10 from the magnetic tool bit 28 to give better control of the installing process to the operator.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

I claim:

1. A fastener installing tool for holding and retaining a fastener in a predetermined position prior to installing the fastener, said tool comprising; a body having first and second end portions and a shank portion extending between said first and second end portions, said first end portion terminating in a pair of blades disposed parallel and in spaced relationship with respect to each other to define a slot therebetween for holding and retaining the fastener therein, said second end portion including a polygonal shape presenting a plurality of surfaces adapted to be supported in a tool bit holder, said assembly characterized by said shank portion presenting a pair of sloping surfaces extending between said first and second end portions and converging toward one another in the direction of said pair of blades to present a low profile at said pair of blades of said first end portion.

2. A tool as set forth in claim 1 further characterized by said body of said tool being susceptible to a magnetic force such that the fastener may be magnetically retained between said blade and within said slot in said first end portion.

3. A tool as set forth in claim 2 further characterized by said plurality of surfaces of said polygonal second end portion defining a planes forming obtuse angles with respect to each other and adapted to be received and supported in a tool bit holder.

4. A tool as set forth in claim 3 further characterized by said plurality of surfaces forcing a hexagonal shape.

5. A tool as set forth in claim 4 further characterized by said tool being made of a magnetically susceptible material.

6. A tool as set forth in claim 5 further characterized by said tool being made of cast iron.

* * * * *